Dec. 29, 1942.  R. S. LYSTER  2,306,818
PETROLEUM HEATER
Filed Oct. 18, 1939  2 Sheets—Sheet 1

INVENTOR.
ROY S. LYSTER
BY Virgil E. Woodcock
ATTORNEY.

Dec. 29, 1942.　　　R. S. LYSTER　　　2,306,818
PETROLEUM HEATER
Filed Oct. 18, 1939　　　2 Sheets-Sheet 2
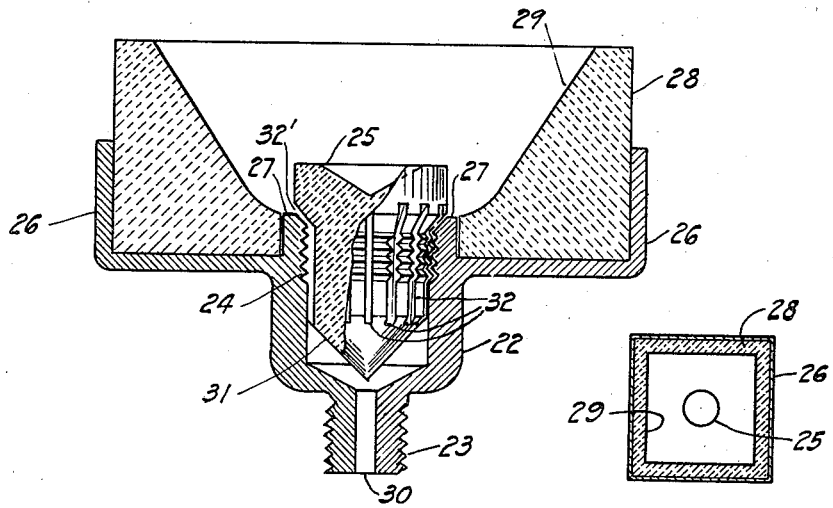
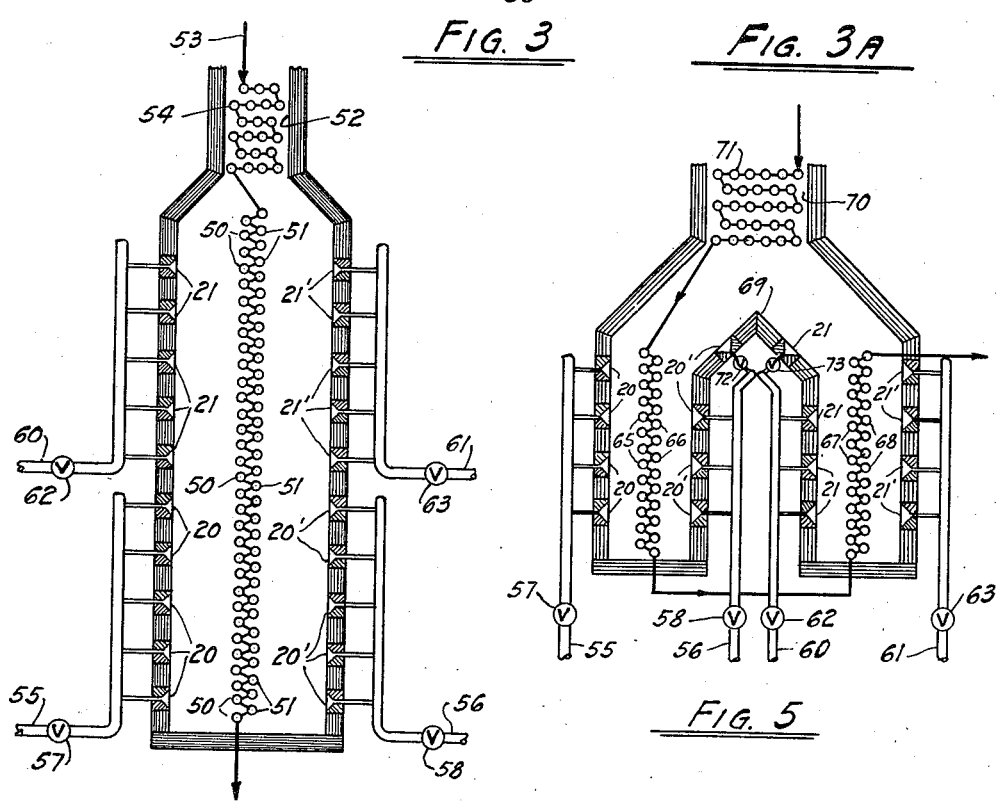
INVENTOR.
ROY S. LYSTER
BY
Virgil E. Woodcock
ATTORNEY.

Patented Dec. 29, 1942

2,306,818

UNITED STATES PATENT OFFICE 2,306,818

PETROLEUM HEATER

Roy S. Lyster, Lansdowne, Pa., assignor to Alcorn Combustion Company, Philadelphia, Pa., a corporation of Delaware Application October 18, 1939, Serial No. 299,935

2 Claims. (Cl. 196—116)

My invention relates to methods of and apparatus for heating fluid, more particularly to the heating of hydrocarbons such as oil or petroleum in either liquid or vapor phase, and has for an object the provision of a heating system characterized by low cost and the uniformity and controllability of the application of radiant heat to heat absorption structures.

The advantages of separately applying radiant and convection heat to oil conducting structures disposed in different zones are fully set forth in U. S. Letters Patent #1,591,431, Nash et al., 2,113,331 Nash et al., and 2,129,589, Praeger. According to the disclosures of said patents, a part of the heat generated by the combustion of fuel is first applied substantially solely by radiation to heat absorption structure, and the remaining heat of the products of combustion at reduced temperature is then applied to oil-conducting structure by convection and/or radiation. The heating systems and methods disclosed in said patents have found great favor in the oil industry and are widely used.

In accord with my invention I provide a heating system and method in which the radiant heat is applied exclusively to one structure before the application of heat by convection to another structure. In carrying out my invention in one form thereof I provide a plurality of burners in spaced relation with one heat absorption structure and distributed over an area as great as the length and breadth of the associated heat absorption structure. At each of the burners I sub-divide the fuel streams to such a degree that a plurality of short flames issue therefrom without substantial velocity in the direction of the absorption structure: Wherefore, the burners as a whole form a source of radiant heat which may be located quite near the heat absorption structure, and as close as one or two feet. The source of radiant heat comprising the multiplicity of burners and flame jets covers such an area as to uniformly heat the exposed surface of the heat absorption structure.

Further, in accord with my invention, different areas of the source of radiant heat may be separately controlled so as to regulate the application of heat to corresponding opposed areas of heat absorption surface. In this manner the application of heat to the oil may be closely regulated in accord with the requirements of the particular oil passing through the structure, and the application of heat may be at widely differing rates per unit of area per unit of time for different sections or areas of the same structure.

For a more complete understanding of my invention reference should now be had to the drawings in which:

In Fig. 1 is a vertical sectional view of a heater embodying my invention;

Fig. 3 is a greatly enlarged detailed view of a suitable type of burner;

Fig. 3A is a plan view of a modified type of burner;

Fig. 4 is a vertical sectional elevation of modified form of heater embodying my invention; and Fig. 5 is a vertical sectional elevation of a heater comprising a further embodiment of my invention.

Figure 2:
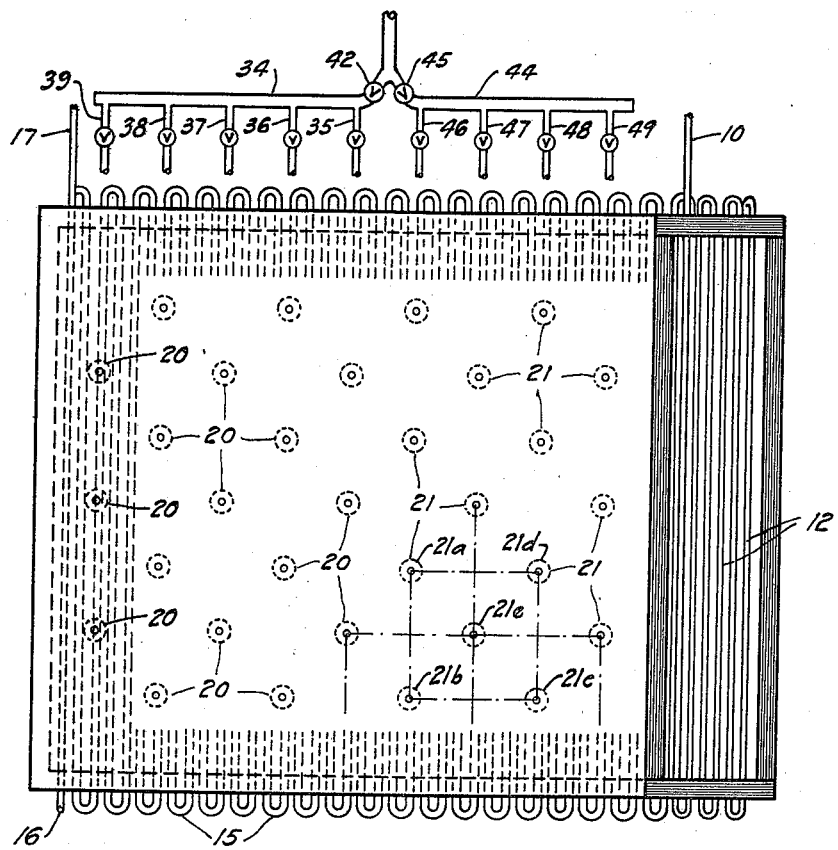
Fig. 2 is a plan view of the heater of Fig. 1 with certain parts omitted.

Referring to the drawings I have shown by invention in one form thereof, as applied to the heating of a stream of oil which from a supply line 10 is forced by pump 11 through a bank of convection tubes 12 located in a chamber or section 13, connected to a stack (not shown). From the convection bank 12 the oil flows through a transfer line 14, a bank of floor tubes 15, side wall tubes 16, thence by outlet line 17 to other equipment (not shown) suitable for the further treatment of the oil, and recovery of products such as motor fuel or gasoline. Opposite the floor tube bank 15 and substantially co-extensive with the length and breadth thereof, are a plurality of burners 20, 21, each located as a component part of the roof structure and each directed toward the floor tubes.

These burners, of any construction suitable for the purposes of the invention, may take various forms. A burner of the preferred type is illustrated in Figs. 3 and 3A and comprises a metal element 22 threaded at 23 for connection to a fuel supply line, and threaded at 24 to receive a central element or cone 25 made of refractory material. The element 22 additionally includes flanges 26 and 27 between which is mounted a refractory element or cone 28 having a reflecting portion 29 which extends outwardly and upwardly from the upper edge of flange 27. A mixture of fuel and combustion air enters in a stream through the inlet 30 and is distributed by element or cone 31 into a plurality of slots 32. The sub-divided streams are discharged outwardly and upwardly, as viewed in Fig. 3, from the slots 32 to form a closed or annular ring of flame jets. Preferably the burner openings or jets, as indicated at 32', extend generally parallel to the wall of the reflecting surface 29, thereby heating it to incandescence. The size of the burner openings or slots 32 is so selected with respect to the pressure and the character of the combustible mixture that substantially complete combustion of the fuel occurs within a few inches from the discharge, and preferably before the flame reaches the outermost portions of the refractory element 28. While it is to be understood that the burners illustrated in the several embodiments of my invention are preferably of this type, any burner may be used which so sub-divides the fuel as to provide for complete combustion within a few inches from the discharge openings.

Figure 1:
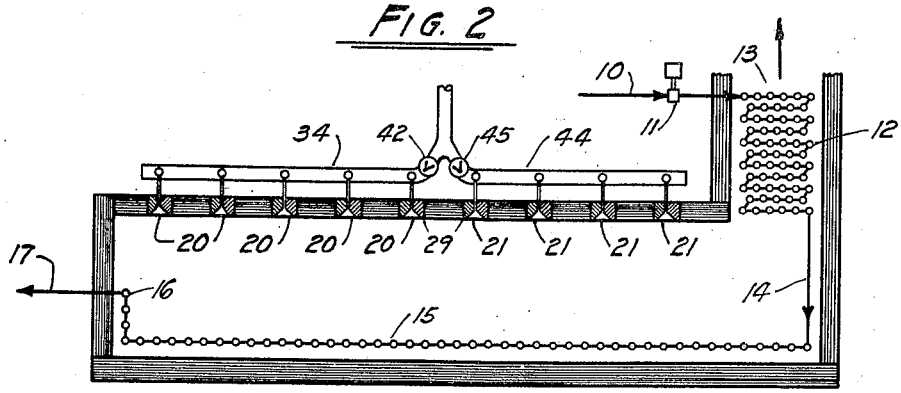

By so sub-dividing the fuel in a plurality of relatively low-velocity jets and by completing the combustion of the fuel within the region immediately adjacent the burners, the burner-bank as a whole is located relatively close to the floor tubes 15. This distance may be a foot or less, although I prefer about four feet for those cases where a man must enter the fire chamber for inspection purposes. As shown in Fig. 1, the conical recess 29 of each of the burners is pointed toward the floor tubes, or the refractories are concave in the direction of the floor tubes. Such a recess or concavity of the refractory directly behind the jets of flame produced by each burner aids combustion and serves the purpose of re-directing heat toward, and distributing it over the floor tubes more uniformly to heat them. The reflecting surface may slope at an angle of about forty-five degrees, and at such an angle as to cover a definite area of heat absorption surface.

In the plan view of Fig. 2, I have illustrated 31 burners spaced equally from each other and as a bank generally co-extensive with the projected area of the floor tube bank. The 31 burners shown, are by way of illustration only, and are not to be taken as limitative. As many burners as may be conveniently located in the roof structure may be used, and less depending upon the heat-absorbing capacity desired for a particular tube bank of a heater. In general, burners of a number which will produce transfer rates as high as 20,000 B. t. u. per square foot of heat absorption surface per hour may be used. The number of burners is preferably correlated with the areas receiving radiant heat so that the area receiving heat from each burner does not to substantial degree overlap adjacent like areas; or if overlapping provides uniform application of heat throughout the bank.

More particularly, in accord with one form of my invention the reflecting elements 28 may be rectangular or square as shown in Fig. 3A, selectively to direct radiant heat over a fixed area of heat absorption surface. For example in Fig. 2, the burner 21e having a square reflector directs heat over the area of the floor tubes 15 defined by the square formed by projecting the points 21a, 21b, 21c and 21d onto the floor. By locating like burners above the apices of that square, as at 21a—21d, each of the burners 21a—21d will selectively produce and direct radiant heat to one-fourth of the square receiving radiant heat from burner 21e. By overlapping the heat receiving areas the average intensity of heat applied throughout the bank is quite high and exceedingly uniform. Thus while the intensity of radiant heat decreases as the distance from burner 21e to the heat-receiving area is increased the distance to an adjacent burner is correspondingly decreased. Therefore the sum of the heat inputs from the burners for any given heat-absorption area is substantially equal to that of any other area.

The outer walls of the heater may be spaced somewhat nearer the adjacent burners than the spacing between burners so that part of the heat directed downwardly therefrom will be redirected from the sidewalls to increase the intensity of heat upon those portions of the tubes selectively receiving heat from only the outermost burners. This feature further contributes to greater uniformity of heat application.

As I have indicated, the burners are preferably of the type to which there is fed a combustible mixture of fuel gas and combustion air, little if any excess air being provided, which is an advantage in producing a short length of flame. Such a mixture may be supplied through a header 34 by way of a plurality of branch lines 35—39, each line being provided with a control valve. A master control valve 42 may be included in the supply line 34 to control the operation of the burners 20 as a whole and simultaneously. Similarly a header or supply line 44 provided with a main control valve 45 and branch lines 46—49 leading to the burners 21 supplies the combustible mixture to the remaining burners.

Frequently in the cracking of a hydrocarbon oil it is desirable to heat it to a cracking temperature with a very high rate of heat application and after the attainment of its cracking temperature to reduce the rate of heat application so as to maintain the oil at such temperature a predetermined time interval, during which its heavier constituents are converted into lighter constituents, generally within the gasoline range.

In accord with my invention the burners 21 may be fired at high rate to produce a high rate of heat transfer per unit of area per unit of time to the right hand portion of the floor tube bank 15, while the burners 20 may be fired at a much lower rate to produce a much lower rate of heat transfer to the left hand portion of floor tube bank 15, as viewed in Figs. 1 and 2. This selective heating of different sections of the same bank within the same heating chamber results from the selective reflection of radiant heat by each of the reflecting surfaces 29; and without overlapping of radiant heat from burners 21 to the tubes directly opposite burners 20, and vice versa.

For oils of a different character, or for certain oil refining processes, it is sometimes desirable to heat the oil slowly to its cracking temperature and just before its exit from the heating system to elevate its temperature as rapidly as possible. My invention is equally suitable for such a system, in which case the burners 21 are fired at low rate and the burners 20 at high rate to produce the rapid elevation in temperature of the oil during its passage through the left hand portion of the floor tube bank 15. This flexibility of operation is quite advantageous and may result in increased yield of desirable end products, such as gasoline.

If desired, additional valves may be provided, one for each burner, though the number illustrated in Fig. 2 is ordinarily sufficient. By fixing the spacing of burners from each other and from the floor tubes 15 with respect to the configuration or pattern of the heat absorption area selectively heated thereby, maximum uniformity may be obtained either with or without overlapping of the heat-receiving areas. Or, infinitely variable rates of heating of the oil stream coursing through the floor tubes may be obtained since by adjustment of each burner or each burner row the heat input to predetermined heat absorption areas may be varied at will.

In accord with the modification of my invention shown in Fig. 4, tubular heat absorption structure, shown in the form of vertical rows of tubes 50 and 51, is located intermediate a fire chamber provided with an up-draft convection section 52 leading to stack (not shown). Oil or fluid to be heated may flow in any desired sequence through the tubes, preferably by way of supply line 53, a bank of convection tubes 54 and thence through the respective rows of tubes 50 and 51. On opposite sides of the two vertical rows of tubes 50 and 51 and located within, as part of, the side walls are a multiplicity of burners 20 directed toward the tubes. The number of burners, co-extensive with the projected areas of the tube banks, is sufficiently great to form on opposite sides of the tubes, sources of radiant heat which to any point or unit area of tubular surface has substantially the same intensity as to any other point or unit area of tubular heat-absorbing surface. Moreover, the burners are located but two or three feet from the tubes 50 and 51 and at a distance only sufficient for a man to enter the fire chamber for inspection purposes. As previously described, the combustible mixture of fuel-gas and air is sub-divided and burned in jets having insubstantial forward velocity in the region refractory 28, and with no tendency for flame impingement or convective heating of tubes 50 and 51. The refractory surfaces behind the burner jets, and concave toward the tubes 50 and 51 serve to distribute uniformly over the tubes and on opposite sides thereof, radiant heat; wherefore these tubes are substantially uniformly heated throughout their circumferential areas. The reflecting surfaces may be of suitable configuration, as square or rectangular as explained above, for overlapping of the heat applied by adjacent burners for greater intensity in but uniform application of heat.

The lower portions of the tube banks 50 and 51 may be heated at materially different rates than the upper portions of the banks by controlling the burners in groups as explained in connection with Figs. 1 and 2. For this purpose headers 55 and 56 with valves 57 and 58 control the burners 20 and 21', while the headers 60 and 61 controlled by valves 62 and 63, control the burners 21 and 21'. In this manner oil may be heated most rapidly in the tubes opposite the burners 21, 21' and less rapidly in those tubes opposite burners 20, 20' or vice versa.

In accord with the embodiment of my invention shown in Fig. 5 burners 20, 20' are located on opposite sides of two vertical rows of oil-conducting heat-absorbing tubes 65 and 66. From opposite walls of a separate, communicating fire chamber, burners 21, 21' are located on opposite sides of two vertical rows of heat absorbing tubes 67 and 68. The respective fire chambers communicate with each other above a central arch 69, and the products of combustion from both fire chambers pass to stack through a common convection section 70 in which may be located additional heat absorbing tubes 71. The several banks of tubes may be connected as may be desired; for example, for the flow of a stream of oil through the convection tubes 71, the tubes 65 and 66, and thence through the tubes 67 and 68. I have shown two burners near the apex of the V-shaped dividing arch 69, each with its own control valve 72 and 73. These may be used in those cases where it is desired to increase the best absorbed in the convection bank by burning fuel in a zone outside of the radiant zones.

In each of the above-described embodiments, the burner structure is preferably of the same structural dimensions as one, or a group, of refractories, so that a burner may be removed and a refractory located in its place. Also, the reflecting surface of each burner though it may be parabolical, is preferably so shaped that the heat reflected from it is distributed over an area of the heat absorption surface which slightly overlaps with the area covered by or receiving radiant heat from the adjacent burners. In this way there is accomplished a maximum uniformity of heat application throughout the bank, and a uniformity over and above that secured by the provision of the plurality of burners, and the multiplicity of flames at each burner.

Or, as explained above, the area to which heat is applied by one burner may also receive heat from one or more burners, the overlapping being such as to not only increase the intensity or rate of heat application but to make more uniform over a given area the application of heat.

From this application there has been divided the specific subjects matter as shown in Figs. 1 and 2 hereof and a separate application for Letters Patent, Serial No. 438,856, filed April 13, 1942, for Petroleum heater, made therefor.

While I have shown particular embodiments of my invention, it will be understood that I do not limit myself thereto, since many embodiments may be made and I, therefore, contemplate by the appended claims to cover any such modifications as fall within the spirit and scope of my invention.

What I claim is:

1. A system of heating oil to at least its distillation temperature, comprising walls forming a pair of fire chambers in direct communication one with the other, a convection section centrally above and in open communication with said fire chambers, two of said walls separating said fire chambers and forming a free air space between them and between said fire chambers, a bank of radiantly heated tubes intermediate each of said fire chambers with the top tube thereof below the top of said two walls, a plurality of burners disposed on opposite sides of each of said banks of tubes and distributed along the walls opposite the length and breadth of each of said banks of tubes, each said burner including means for sub-dividing fuel into individual streams for short flame-length burning thereof, a convection bank of tubes in said convection section, and additional burners disposed along said two walls at levels above said top tubes of said radiantly heated banks of tubes for increasing the heat input to said convection bank without materially affecting the heat input to said radiantly heated tubes.

2. A system of heating oil to at least its distillation temperature, comprising a double wall structure forming an air space between a pair of fire chambers in direct connection one with the other, an updraft convection section above and between and in open communication with said firm chambers for receiving products of combustion therefrom, oil-conducting heat-absorbing tubes within said convection section, a bank of oil-conducting heat-absorbing tubes within each of said fire chambers extending intermediate opposite walls thereof, with the individual tubes thereof spaced one above the other, a plurality of gas burners supported in said double wall structure and in each of said opposite walls and directed toward the bank of tubes therebetween, each burner including means for producing a plurality of flames of short length and of insubstantial forward velocity in the direction of said tubes, a reflecting surface directly behind each of said burners for directing radiant heat to a predetermined area of the adjacent bank of tubes, the shape of said reflecting surface and its distance from its adjacent bank of tubes and the spacing of the burners one from the other having a dependent relation such that radiant heat is substantially uniformly applied to both sides of each bank, and means for controlling the flow to said burners of a mixture of fuel and combustion air.

ROY S. LYSTER.